US009850138B2

(12) United States Patent
Chinloy et al.

(10) Patent No.: US 9,850,138 B2
(45) Date of Patent: Dec. 26, 2017

(54) PONDS FOR COOLING AND/OR SALT RECOVERY

(71) Applicant: Hatch Ltd., Mississauga (CA)

(72) Inventors: David R. Chinloy, Mississauga (CA); Jianping Zhang, Mississauga (CA); Evangelos Stamatiou, Mississauga (CA)

(73) Assignee: HATCH LTD., Mississauga (CA)

( * ) Notice: Subject to any disclaimer, the term of this patent is extended or adjusted under 35 U.S.C. 154(b) by 633 days.

(21) Appl. No.: 14/231,351

(22) Filed: Mar. 31, 2014

(65) Prior Publication Data

US 2015/0090408 A1    Apr. 2, 2015

Related U.S. Application Data

(60) Provisional application No. 61/883,523, filed on Sep. 27, 2013.

(51) Int. Cl.
B01D 1/24    (2006.01)
C01D 3/08    (2006.01)
(Continued)

(52) U.S. Cl.
CPC .............. C01D 3/08 (2013.01); B01D 1/24 (2013.01); C01D 3/06 (2013.01); F24J 2/0461 (2013.01);
(Continued)

(58) Field of Classification Search
CPC .......... F24J 2/0461; F24J 2/0466; B01D 1/00; C02F 1/04; C02F 3/06; C02F 3/08
See application file for complete search history.

(56) References Cited

U.S. PATENT DOCUMENTS 2,826,306 A * 3/1958 Burns ................ B01D 17/0211
                                                    210/114
3,704,101 A   11/1972 Kelly
(Continued)

FOREIGN PATENT DOCUMENTS

CA    842576    5/1970
CA    866570    3/1971
(Continued)

OTHER PUBLICATIONS

Andy Shilton and Jill Harrison, Guidelines for the Hydraulic Design of Waste Stabilization Ponds, 2003, Institute of Technology and Engineering Massey University, pp. 1-64.*
(Continued)

Primary Examiner — Jonathan Miller
(74) Attorney, Agent, or Firm — Rao DeBoer Osterrieder, PLLC; John M. DeBoer

(57) ABSTRACT

A pond for cooling and/or recovering salt from a hot aqueous solution of a salt such as potassium chloride produced by solution mining. The pond comprises a plurality of channels arranged side-by-side, each of the channels being defined by a plurality of sides. An inlet is provided in a side of a channel for receiving the aqueous solution, and an outlet is provided in a side of another one of the channels for discharging the aqueous solution. The pond has at least one dike separating the channels from one another. A gap is formed in each dike to permit the aqueous solution to flow between the channels, the gap having a length which is about 10 to about 40 percent of the length of the sides of the channels. Salt is crystallized and the solution is cooled as it passes through the channels of the pond.

18 Claims, 10 Drawing Sheets

(51) Int. Cl.
  *F24J 2/04*    (2006.01)
  *C01D 3/06*   (2006.01)
  *F28C 3/06*    (2006.01)
  *C02F 1/22*    (2006.01)

(52) U.S. Cl.
  CPC ............... *F24J 2/0466* (2013.01); *F28C 3/06* (2013.01); *C02F 1/22* (2013.01)

(56) References Cited

U.S. PATENT DOCUMENTS

| | | | | |
|---|---|---|---|---|
| 3,887,459 | A | * | 6/1975 | McLaughlin ............. C02F 1/00 210/622 |
| 3,918,916 | A | | 11/1975 | Garrett |
| 4,243,392 | A | | 1/1981 | Brown et al. |
| 4,386,936 | A | | 6/1983 | Geesen |
| 4,446,700 | A | * | 5/1984 | Bronicki ................. F03G 6/005 290/4 C |
| 4,465,056 | A | * | 8/1984 | Elata ................... F28D 20/0043 126/567 |
| 4,564,508 | A | | 1/1986 | Fairweather et al. |
| 5,017,043 | A | * | 5/1991 | Assaf ................... B01D 1/0082 210/170.09 |
| 5,041,217 | A | * | 8/1991 | Reid ..................... C02F 3/1257 210/194 |
| 6,197,152 | B1 | * | 3/2001 | Hsu ......................... C01D 15/00 159/23 |
| 8,388,702 | B2 | | 3/2013 | Sadan |

FOREIGN PATENT DOCUMENTS

| | | |
|---|---|---|
| CA | 1103894 | 6/1981 |
| CN | 102619195 A | 8/2012 |
| RU | 2338832 C1 | 11/2008 |

OTHER PUBLICATIONS

S.A. Lowe, Improving the performance of power plant cooling ponds, Journal of Environmental Management, 105 (2012) 90-95.
ISR and Written Opinion of the ISA, pp. 1-9 (Jul. 2014).
Efficient Cooling Ponds: Design, Journal of the Hydraulics Division, vol. 107, No. 11, pp. 1547-1563 (Nov. 1981).
Supplemental European Search Report dated Feb. 2, 2017 for EP Application No. 14 84 8039 (7 pgs.).
Chinese Office Action dated Jan. 25, 2017 for for CN Application No. 201480031653.4 (27 pgs.).

* cited by examiner

PONDS FOR COOLING AND/OR SALT RECOVERY

CROSS-REFERENCE TO RELATED APPLICATION

This application claims priority to and the benefit of U.S. Provisional Patent Application No. 61/883,523 filed Sep. 27, 2013, the contents of which are incorporated herein by reference.

FIELD OF THE INVENTION

The invention relates to ponds for cooling and/or recovering salts from aqueous solutions, including ponds for crystallizing salts, such as potassium chloride, from brine produced by solution mining.

BACKGROUND OF THE INVENTION

Cooling and crystallization ponds are used in the solution mining industry to provide relatively adaptable and low energy cost salt production solutions. The use of cooling ponds is especially suited for areas where land is not a limiting factor, and the weather is favourable for cooling (i.e. low ambient temperature and low precipitation). Moreover, cooling ponds do not require major investment and maintenance, making it an attractive technology for the solution mining industry.

For potash solution mining, the potash is dissolved from deep underground using hot brine and the solution is pumped to the surface for processing into the potash product. The processing of the hot brine may include cooling and crystallization in a pond. The hot brine is typically unsaturated in KCl and NaCl as it is pumped into the inlet of the pond, although saturated inlet brine conditions can also exist with respect to both NaCl and KCl. As it flows through the pond from the inlet to the outlet, the brine is cooled by a number of modes, including radiative, convective and evaporative losses from the pond surface, and conduction losses to the ground. Evaporation will also cause concentration of the brine.

As the brine cools, the solubility of KCl is reduced until saturation is achieved, and with further cooling KCl crystallizes out of solution. Meanwhile, the NaCl concentration remains nearly at or slightly below saturation levels and so does not crystallize out. The KCl crystals fall to the bottom of the pond and are periodically recovered for processing into the potash product.

The configuration of a pond and the brine inflow operating parameters determine the flow patterns which affect the overall performance of the cooling pond. Typical cooling ponds include one or more channels separated by dikes or weirs, each dike or weir having a small gap through which the brine is permitted to flow between the adjacent channels. The inventors have discovered that conventional pond design may lead to poor flow distribution within the pond, and the inventors believe that this poor flow distribution has a detrimental effect on the efficiency of heat transfer and mineral salt productivity (e.g. KCl). Furthermore, the inventors believe that past attempts to improve cooling pond performance without addressing flow distribution have resulted in failure. For example, attempts to improve cooling by simply enlarging the surface area of cooling ponds have not necessarily improved the recovery of salts. Also, simply increasing the flow velocity of the brine through the pond has been found to increase the salt production, but decrease the yield (or productivity).

Therefore, there is a continued need to improve the performance of ponds for cooling and crystallizing salts from brine.

SUMMARY OF THE INVENTION

In an embodiment, there is provided a pond for cooling an aqueous solution. The pond includes a plurality of channels arranged side-by-side, each of the channels being defined by a plurality of sides; an inlet provided in a side of one of said channels for receiving said aqueous solution; an outlet provided in a side of another one of said channels for discharging said aqueous solution from the pond; at least one dike, wherein each said dike separates an adjacent pair of said channels from one another and defines one of the sides in each of the channels which it separates, said adjacent pair of channels comprising an upstream channel and a downstream channel; and at least one gap, wherein each said gap is formed in one of said dikes to permit the aqueous solution to flow between the upstream channel and the downstream channel, the gap having a length which is about 10 to about 40 percent of the length of the sides of the channels.

In one aspect, each of the gaps has a length which is about 20 to about 40 percent, or from about 25 to about 35 percent of the length of the sides of the channels.

In another aspect, each of the gaps is located proximate to an end of one of the dikes.

In yet another aspect, the pond includes a plurality of said dikes and a plurality of said gaps, and the gaps in an adjacent pair of said dikes are located at opposite ends of said dikes.

In yet another aspect, the dikes are substantially parallel to one another.

In yet another aspect, at least some of the channels have a generally rectangular shape with a pair of longer sides and a pair of shorter sides, and wherein the dikes define at least one of the longer sides of each said channel.

In yet another aspect, the inlet is defined by an inlet opening and a pair of outwardly diverging walls which provide the inlet with a fan shape. For example, each of the outwardly diverging walls of the inlet may extend outwardly from the inlet opening to one of the longer sides of the channel in which the inlet is provided.

In yet another aspect, the side of the channel in which the inlet opening is provided is one of the shorter sides of the channel.

In yet another aspect, the channels are arranged in a single row, or the channels are arranged in a plurality of rows.

In yet another aspect, at least one of said channels is an upstream channel, and wherein at least one of said channels is a downstream channel, wherein the upstream channel is located proximate to the inlet and the downstream channel is located proximate to the outlet; and wherein the upstream channel has a different aspect ratio than the downstream channel.

In yet another aspect, the upstream channel has a lower aspect ratio (channel width to channel depth) than the downstream channel and may be wider than the downstream channel.

In yet another aspect, the upstream channel is wider than the downstream channel, and/or may be deeper than the downstream channel.

In yet another aspect, the pond includes a plurality of said inlets, and the plurality of inlets may be arranged side-by-side.

BRIEF DESCRIPTION OF THE DRAWINGS

The invention will now be described, by way of example only, with reference to the accompanying drawings, in which.

DETAILED DESCRIPTION

The following is a description of specific embodiments of ponds for recovery of potassium chloride from brine produced by a potash solution mining process. Although the following embodiments relate specifically to potash solution mining, it will be appreciated that the pond design improvements disclosed herein can be applied in other processes for recovering salts from aqueous solutions, or for improving the performance of power plant cooling ponds.

Figure 1:
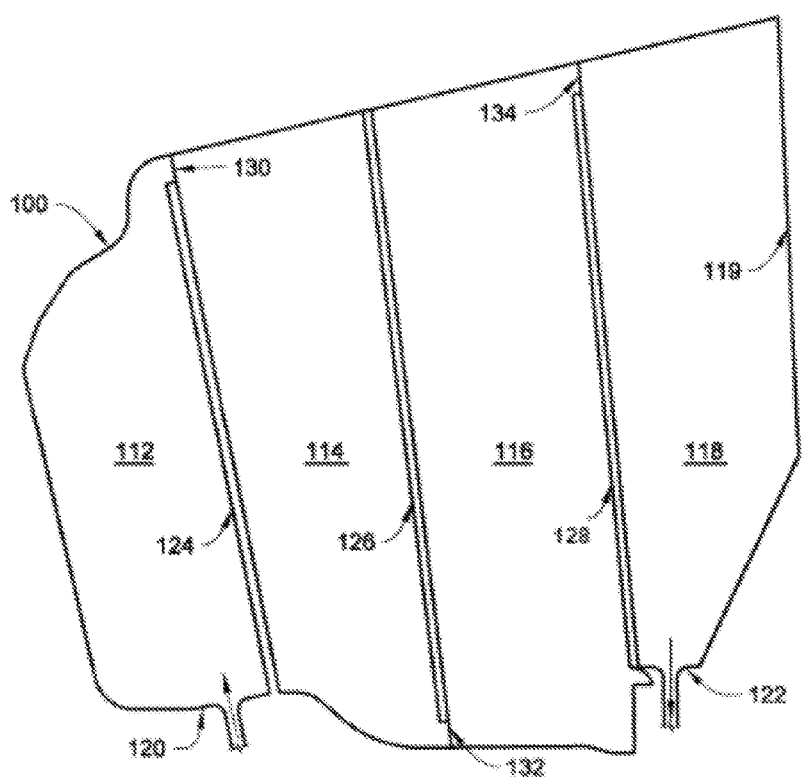
FIG. 1 is a schematic plan view of a pond according to the prior art.

FIG. 1 illustrates a conventional cooling pond 100 comprising a plurality of channels of substantially the same size, including a first channel 112, a second channel 114, a third channel 116 and a fourth channel 118. The channels are generally rectangular in shape, having two long sides and two short sides. The outer perimeter of pond 100 is defined by an earthen wall 119. In the following description, the lengths of the channels are defined by the longer sides, and the widths of the channels are defined by the shorter sides.

The prior art cooling pond 100 includes an inlet 120 located in the first channel 112, the inlet 120 comprising a gap in the wall 119 for receiving a brine solution comprising potassium chloride and sodium chloride. The inlet 120 may be located in one of the short sides of the first channel 112, distal from the second channel 114, to prevent short-circuiting of the brine flow through the pond 100. The pond 100 also includes an outlet 122, located in a short side of the fourth channel 118, for discharging the mother liquors after crystallization of the potassium chloride from the brine.

The channels of pond 100 are separated from one another by dikes 124, 126 and 128, which may be constructed of earth. Each dike has a gap for permitting flow of the brine from one channel to the next. The gaps are labelled in FIG. 1 as 130, 132 and 134. The gaps are located at the ends of the dikes and are arranged such that the brine follows a zig-zag or serpentine flow path from the inlet 120 to the outlet 122.

Cooling pond 100 may have a total area of about 150 acres (or 600,000 m$^2$) and a depth of about 5 ft. The brine may have an initial KCl concentration of about 130 g/L, and may flow through pond 100 at a flow rate ranging from about 3,000 to about 12,000 US gpm, with the temperature of the brine being reduced from about 80° F. at inlet 120 to about 12° F. at outlet 122.

Figure 2A:
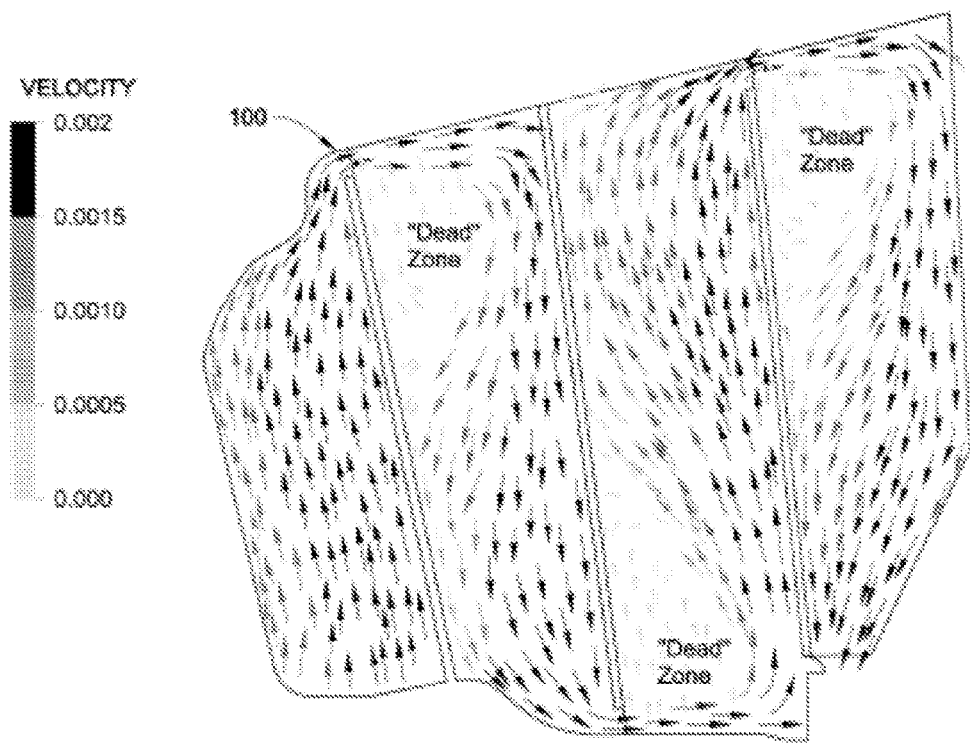
FIGS. 2a and 2b illustrate the flow velocity field (a) and temperature distribution (b) in the pond of FIG. 1.
Figure 2B:
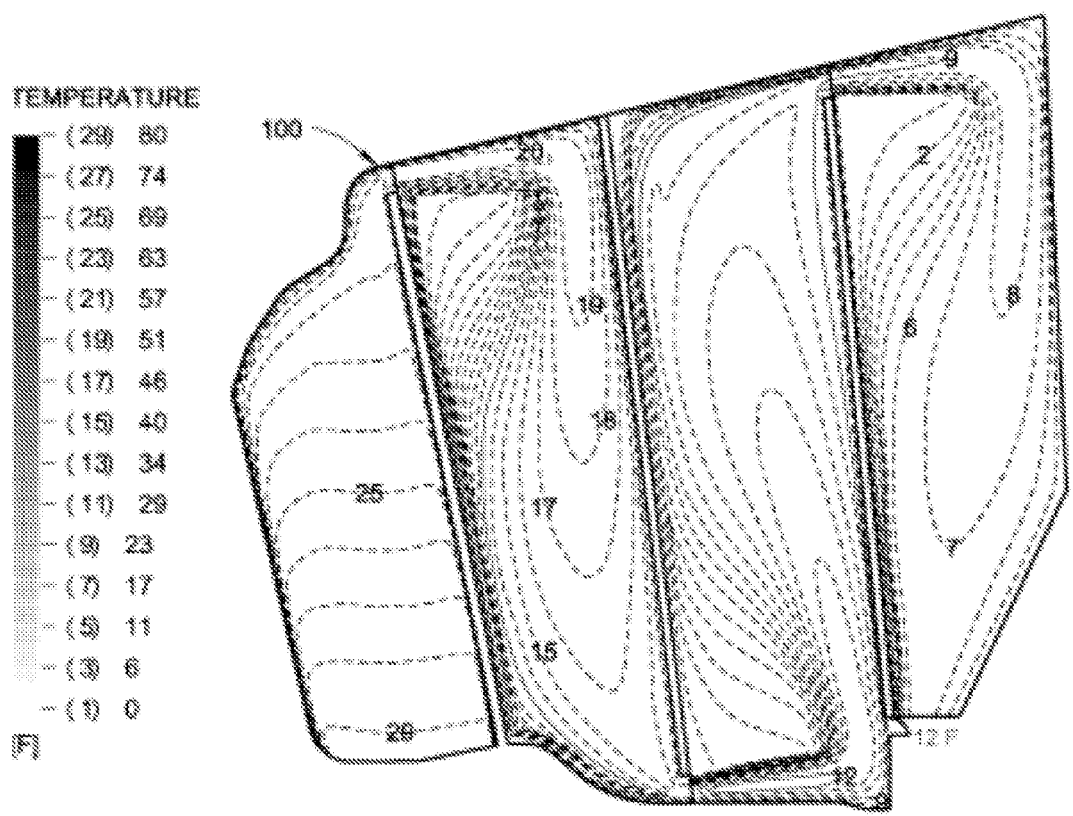

In conventional cooling ponds, the gaps 130, 132, 134 are relatively small compared to the lengths of the dikes and the channels. The small gap size was believed in the prior art to be necessary to prevent short-circuiting of the flow from one channel to another. For example, the typical ratio may be about 0.04 to 0.05, i.e. the length of each gap is about 4-5% of the channel length. However, as a result, the flow velocity of the brine as it flows through the gaps is relatively high. The inventors have found that this causes the flow of brine to "jet" through the gap and across the width of adjacent channel, resulting in large recirculation zones or "dead zones" immediately downstream of each gap. The locations of the recirculation zones are apparent from the flow velocity field diagram of FIG. 2(a) and the temperature distribution diagram of FIG. 2(b). The inventors have also found that the creation of these recirculation zones reduces the effective surface area for cooling, resulting in reduced cooling performance.

Figure 3:
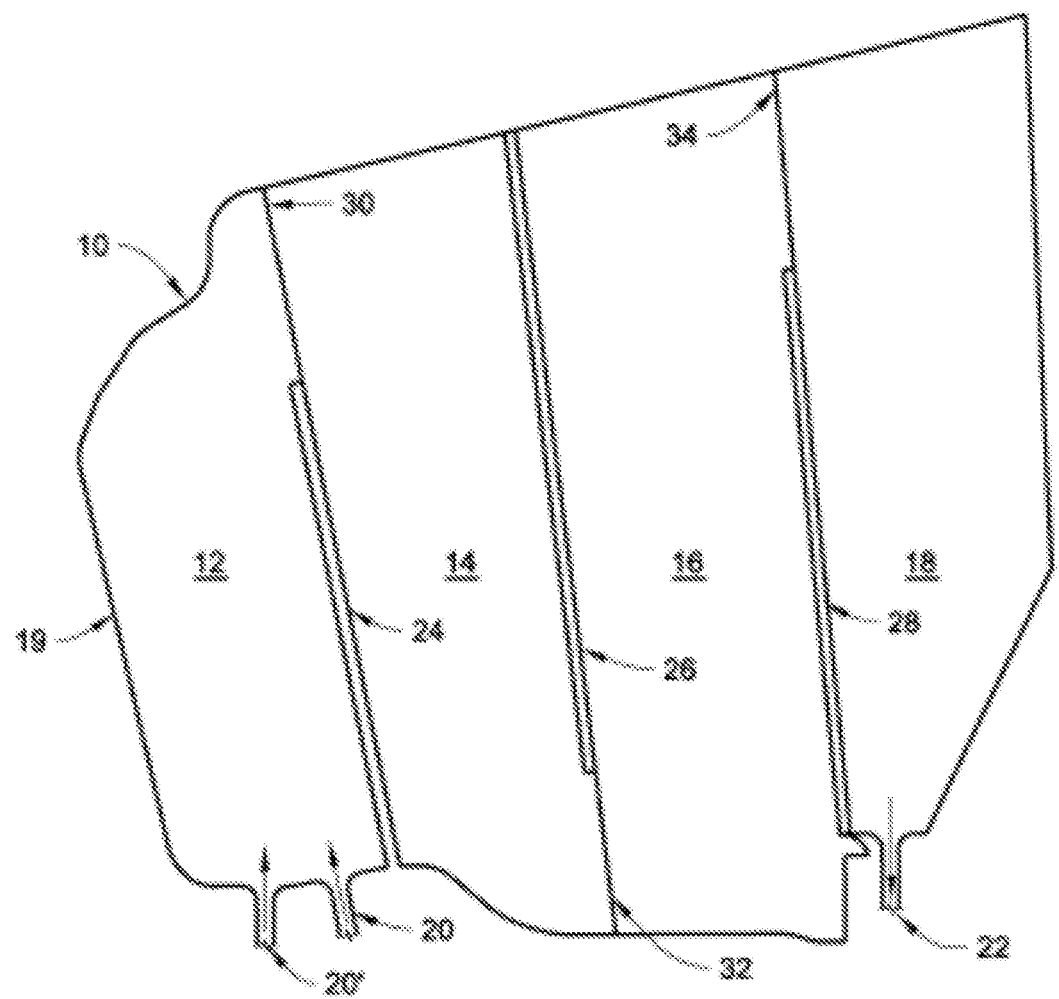
FIG. 3 is a schematic plan view of a pond according to an embodiment of the invention.

Turning to cooling pond designs according to the invention, FIG. 3 illustrates a pond 10 having a configuration similar to the prior art pond 100 described above. Pond 10 comprises a plurality of channels, namely, a first channel 12, second channel 14, third channel 16 and fourth channel 18. The channels 12, 14, 16, 18 of pond 10 are each shown as having a generally rectangular configuration, with two longer sides and two shorter sides. The outer perimeter of the pond 10 is typically defined by an earthen wall 19. The channels of pond 10 are shown in the drawings as being of similar size and shape, although this is not necessary.

Although pond 10 is shown as comprising four channels, it will be appreciated that this is not necessary. Rather, at least some of the improvements provided by the invention are applicable to ponds having one or more channels.

The pond 10 includes an inlet 20 located in the first channel 12, the inlet comprising a gap in the wall 19 for receiving a brine solution comprising potassium chloride and sodium chloride. The pond 10 also includes an outlet 22, located in the fourth channel 18, comprising a gap in wall 19 for discharging the mother liquors after crystallization of the potassium chloride from the brine.

The channels 12, 14, 16, 18 of pond 10 are separated from one another by dikes, which may also be constructed of earth and which extend above the level of the brine in pond 10. Alternatively, the channels may be separated by weirs which may be constructed of sheet materials such as fabric. In the present embodiment, a first dike 24 separates the first and second channels 12, 14, a second dike 26 separates the second and third channels 14, 16, and a third dike 28 separates the third and fourth channels 16, 18.

As shown in FIG. 1, each dike has a gap for permitting flow of the brine from one channel to the next. In this regard, the first dike 24 has a gap 30, the second dike 26 has a gap 32, and the third dike 28 has a gap 34. Each gap is located at the end of its respective dike, and it can be seen that the gaps 30, 32, 34 are arranged at alternating ends of the pond 10, and are arranged relative to the inlet 20 and outlet 22 such that the brine follows a zig-zag or serpentine flow path from the inlet 20 to the outlet 22. This arrangement results in the brine making a series of end-to-end passes through the channels of pond 10, increasing retention time and preventing short-circuit flow, so as to optimize cooling of the brine.

Further, the inlet 20 and outlet 22 are located along short sides of respective channels 12 and 18, distal from respective gaps 30 and 34, to prevent short-circuit flow of the brine through the pond 10. However, it will be appreciated that the inlet 20 and outlet 22 may instead be located at corners of channels 12 and 18, or in the long sides of channels 12 and 18, distal to the gaps 30 and 34.

In the pond 10 constructed in accordance with the present invention, the gaps 30, 32, 34 between the channels 12, 14, 16 and 18 are increased in length (gap length being measured along the length of the channels), relative to the lengths of the channels. For example, in the embodiment shown in the drawings, the ratio of gap length to total channel length (i.e. length of gap+length of dike) is about 20-40%, for example about 25-35%, which is about one order of magnitude greater than the typical gap length in conventional cooling ponds, discussed above.

Figure 4A:
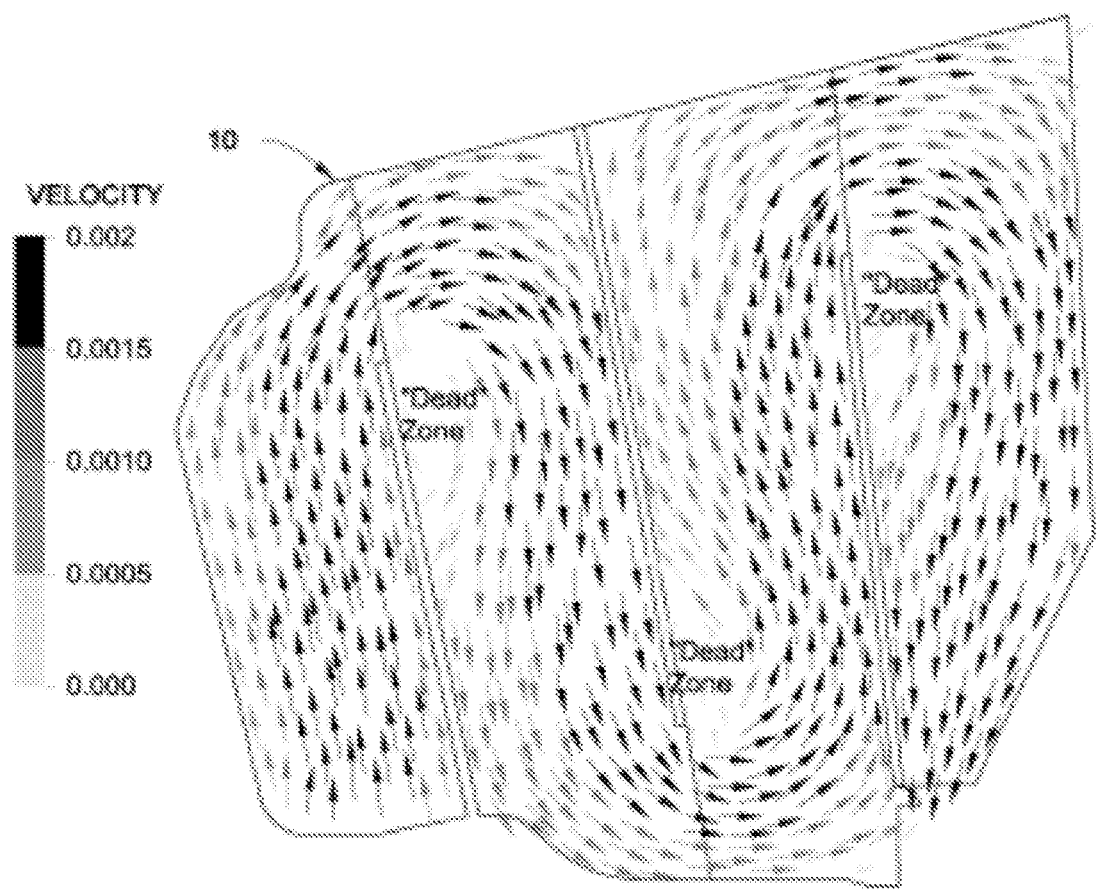
FIGS. 4a and 4b illustrate the flow velocity field (a) and temperature distribution (b) in the pond of FIG. 3.
Figure 4B:
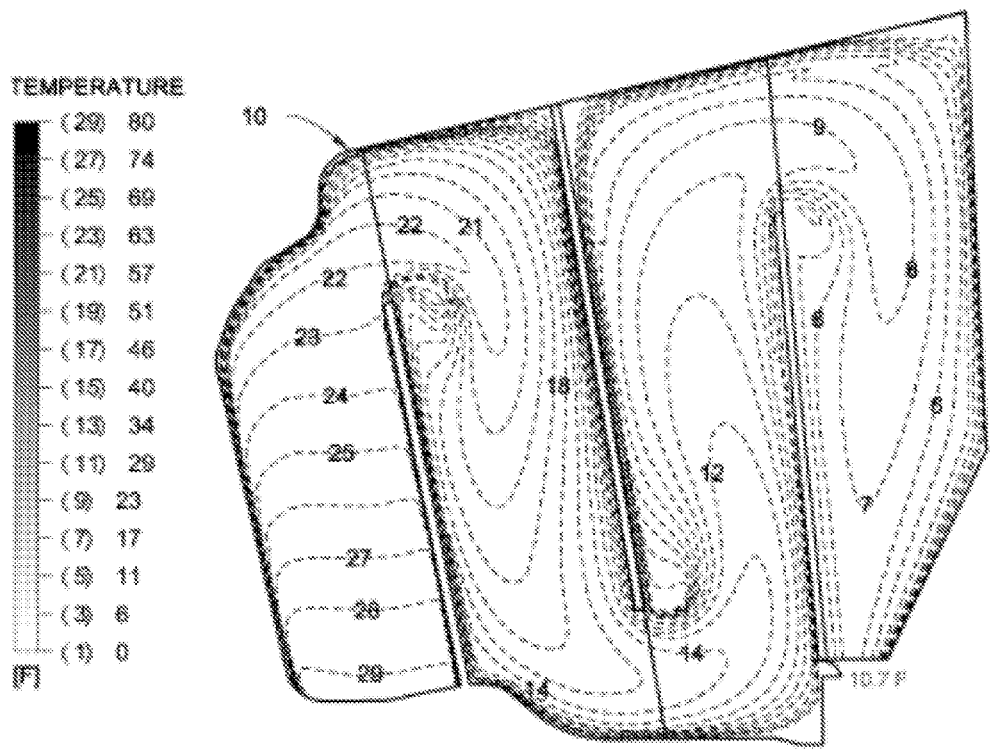

Although the increased length of the gaps may be expected to result in greater short-circuiting of flow between channels, and hence reduced cooling performance, the inventors found that it has the opposite result. In this regard, the substantial increase in the lengths of the gaps reduces the tendency of the brine flow to "jet" across the adjacent channel and reduces the size of the recirculation zones immediately downstream of the gap. The locations of the recirculation zones are apparent from the flow velocity field diagram of FIG. 4(a) and the temperature distribution diagram of FIG. 4(b). Thus, the inventors have found that increasing the lengths of the gaps results in a more uniform flow distribution across the widths of the channels, and provides improved cooling performance.

The inventors have similarly found that altering the configuration of the inlet 20 can improve the flow distribution across the width of the first channel 12. An embodiment of the invention with an altered inlet configuration is now discussed below with reference to FIG. 5.

In conventional cooling ponds, as shown in FIG. 1, the small size of the inlet opening causes the brine to "jet" through the first channel 12 without being distributed across the channel width. This configuration results in the formation of one or more recirculation zones along the long sides of the first channel 12, reducing the effective surface area for cooling, and resulting in reduced cooling performance.

In the present invention, an improved flow distribution across the width of the first channel 12 is achieved by increasing the effective size of the inlet 20. In one embodiment this is achieved by providing a plurality of inlet openings into the first channel 12. For example, in addition to the inlet 20, a second inlet 20' may be provided through wall 19 along one of the short sides or long sides of the first channel 12. According to one embodiment, the second inlet 20' may be located along the short side of first channel 12 in which the first inlet 20 is located, spaced by about 2-3 pipe diameters from the first inlet 20. A possible location of second inlet 20' is shown in FIG. 3. It will be appreciated that channel 12 may include more than two inlets, and that additional inlets can be located in the same short side in which inlets 20, 20' are located, in the adjacent longer side of channel 12, and/or at the corner of the longer and shorter sides.

Although the provision of one or more additional inlets may be expected to reduce cooling performance by increasing short-circuit flow, the inventors have found that the beneficial impact of a second inlet 20' and further inlets on the flow distribution provides improved cooling performance over the conventional construction, having one relatively small inlet.

Figure 5:
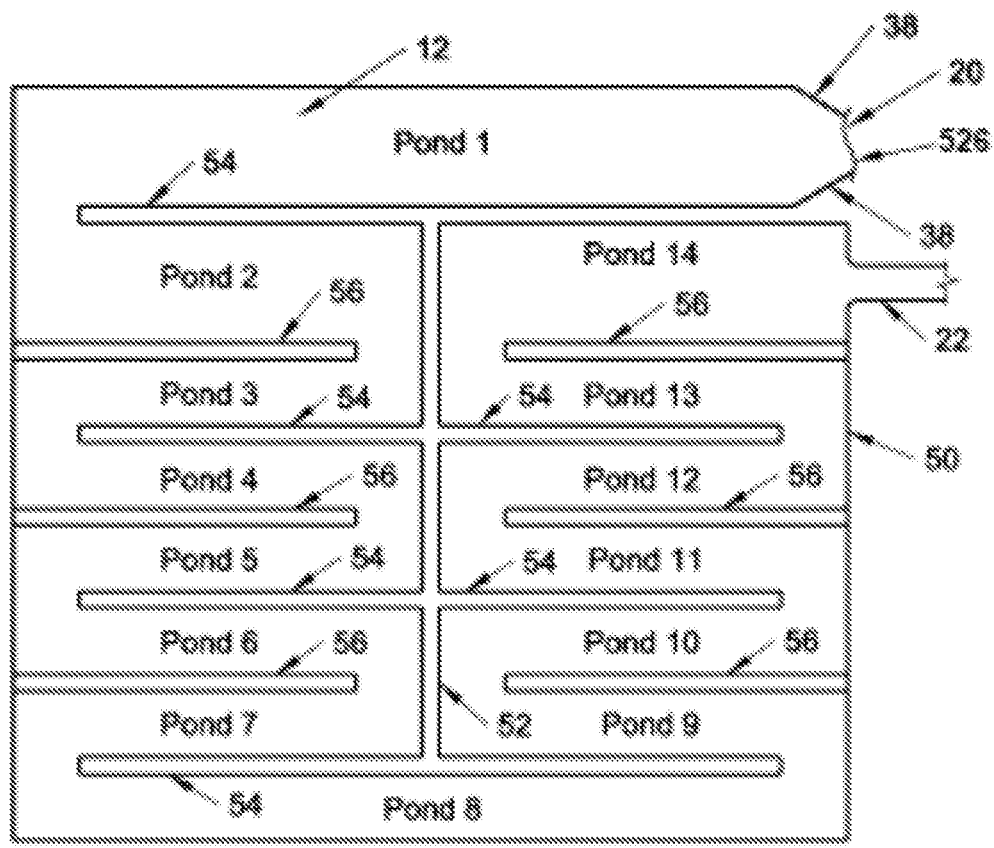
FIG. 5 is a schematic plan view of a pond according to another embodiment of the invention.

In a cooling pond according to another embodiment, shown in FIG. 5, the effective size of the inlet 20 is increased by providing the inlet 20 with an outwardly tapered, fan-like configuration. The fan-shaped inlet 20 has a relatively small mouth 526, with outwardly tapering side walls 38 increasing the effective width of the inlet 20. The taper angle of the side walls relative to the walls of the inlet channel 12 is variable and will depend at least partly on the width of the channel 12, but may typically be in the range of about 30 to 60 degrees. In order to provide a fan-shaped inlet 20, it may be preferred to locate the inlet approximately in the middle of one of the shorter walls of the first channel 12, as shown in the FIG. 3. For example, each of the tapered walls 38 may extend from one of the shorter walls to one of the longer walls of the first channel 12.

As mentioned above, the provision of dikes with gaps arranged at alternating ends of the channels causes the brine to follow a zig-zag or serpentine flow path from the inlet to the outlet of a cooling pond. Conventional cooling ponds have relatively few, large channels with a relatively low ratio of gap length to channel width, with the aspect ratios (channel width to channel depth) of all the channels being substantially the same or similar. The cooling pond of FIG. 1 has this configuration. While the provision of large channels with relatively low aspect ratios (channel width to channel depth) favours crystallization, the inventors have found that this configuration provides relatively poor cooling performance.

In accordance with the present invention, cooling performance is improved by increasing the aspect ratios of at least some of the channels of pond 10, i.e. by making the channels relatively narrower and longer than the channels of conventional cooling ponds. In addition, the number of channels in the pond may be increased by increasing the number of dikes, and arranging the dikes to increase the pitch/decrease the period of the serpentine flow. This has the effect of increasing the turbulence of the brine flow, which has the effect of reducing recirculation zones in the pond, and providing increased cooling performance.

The increase in pitch or decrease in period of the serpentine flow can be accomplished in a number of ways. For example, in an existing pond, one or more of the channels can be subdivided by installing additional dikes or weirs extending in the lengthwise and/or widthwise direction of the channel. Similarly, a new cooling pond can be designed to have a greater number of channels of greater aspect ratio, with dikes or weirs extending widthwise in the channels to provide increased turbulence.

For example, FIG. 5, illustrates a cooling pond 50 having two rows of channels (labelled Pond 1 to Pond 14 in FIG. 5) with the inlet 20 and outlet 22 located in close proximity to one another. Pond 50 has an arrangement of dikes which includes a lengthwise dike 52 bisecting the pond and separating the two rows of channels, the dike 52 causing the flow of brine to make two passes through the pond 50. A first plurality of widthwise dikes 54 extends at substantially right angles from the lengthwise dike 52 toward the wall of the pond 50, and a second plurality of widthwise dikes 56 extending from the wall of the pond toward the lengthwise dike 52. In this way, the pond 50 is divided into a total of 14 individual channels, each having an aspect ratio greater than the aspect ratios of the channels of the prior art pond 100 shown in FIG. 1. Furthermore, the decreased spacing between the widthwise dikes 54, 56 results in a more turbulent flow than in pond 100, and helps to improve efficiency of cooling.

As mentioned above, increased turbulence may favour improved cooling performance at the expense of crystallization performance. The inventors have found that it is advantageous to maximize the amount of heat removed from the brine in the channels closest to the inlet of the pond, and to maximize crystallization in the channels closest to the outlet of the pond. Therefore, according to an embodiment of the invention, the aspect ratio of the channels of the cooling pond increases from the inlet to the outlet of the pond, so that the turbulence of the brine flow in the upstream channels is greater than the turbulence of the flow in the downstream channels.

Although pond 50 is shown as comprising two rows of channels, this is not necessary, and is at least partly dependent on the amount of space available for pond 50. For example, the channels of pond 50 may instead be arranged in a single row, or they may be arranged in more than two rows.

A further embodiment of a pond according to the invention is now discussed below with reference to FIG. 6. The pond 60 of FIG. 6 comprises a total of eight channels arranged in a single row, labelled 62, 64, 66, 68, 70, 72, 74 and 76, with the inlet 20 and outlet 22 arranged at opposite ends of the pond 60. The inlet 20 has a tapered, fan-shaped configuration as in pond 50 of FIG. 5, defined by mouth 626 and outwardly tapering side walls 38. However, it will be appreciated that the pond 60 could instead be constructed with one or more inlets 20, 20' etc., as in pond 10 described above.

The channels of pond 60 have a greater aspect ratio than the channels of the ponds shown in FIGS. 1 and 3, i.e. they are relatively long and thin. The channels are separated by dikes 78 having gaps 80 at their ends to permit passage of the brine between adjacent channels. The gaps 80 in adjacent dikes 78 are located at opposite ends of the channels to create a tortuous, serpentine flow path through the pond 60. Although pond 60 is shown as having a single row of channels, it will be appreciated that it may instead be constructed to have two rows of channels as in FIG. 5, or more than two rows of channels.

Figure 6:
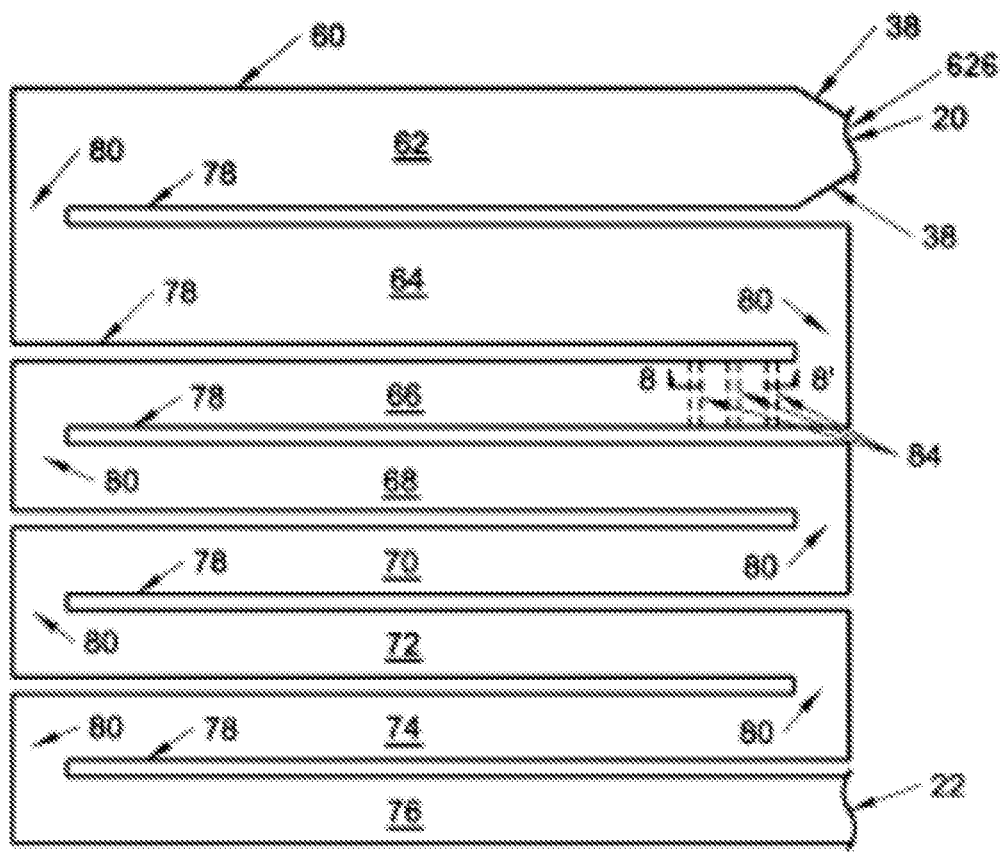
FIG. 6 is a schematic plan view of a pond according to yet another embodiment of the invention.

The pond 60 of FIG. 6 has a structure which maximizes crystallization in the first two channels 62, 64 (the upstream channels), and which maximizes cooling in the last six channels (66, 68, 70, 72, 74 and 76 (the downstream channels). In this regard, it can be seen that the upstream channels 62, 64 have a first aspect ratio and the downstream channels 66, 68, 70, 72, 74 and 76 have a second aspect ratio. The upstream channels are wider than the downstream channels, and therefore have a lower aspect ratio. As discussed above, a lower aspect ratio favours crystallization over cooling, whereas a higher aspect ratio provides more turbulent flow which favours cooling.

Although not apparent from the plan view of FIG. 6, the upstream channels may be deeper than the downstream channels. The provision of shallower downstream channels also promotes cooling, whereas the provision of deeper upstream channels facilitates the operation of dredges to remove the crystallized product from the upstream channels.

Figure 7:
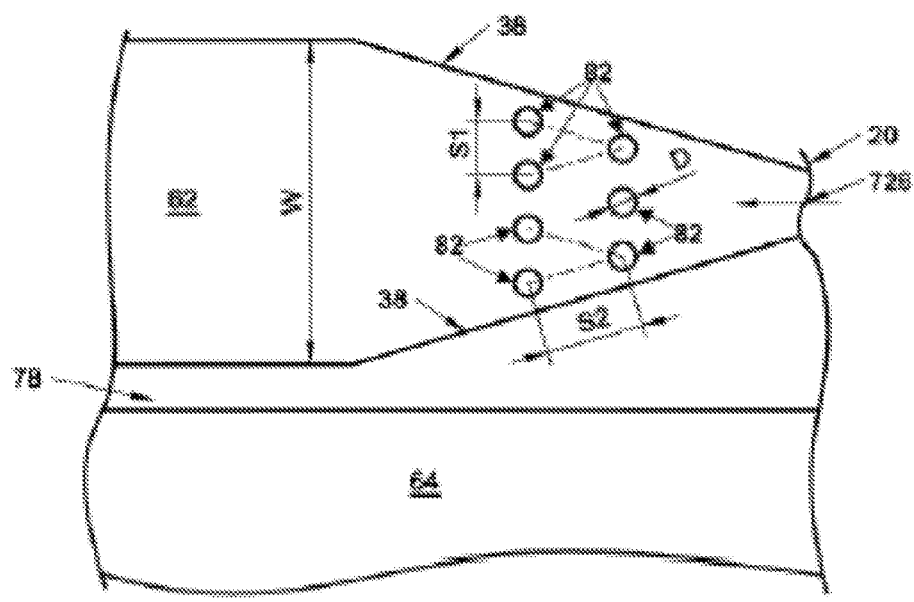
FIG. 7 is a schematic plan view of a pond inlet according to yet another embodiment.

FIG. 7 illustrates a portion of an inlet 20 of a pond which may be similar to pond 60 of FIG. 6, and has a fan-shaped inlet 20 through which the brine enters the first channel 62. As in the embodiments of FIGS. 5 and 6, the inlet 20 shown in FIG. 7 has a tapered, fan-shaped configuration defined by mouth 726 and outwardly tapering side walls 38. To further reduce the tendency of the brine to jet through the inlet 20 as it enters channel 62, the inlet 20 is provided with one or more flow-blocking structures, also referred to herein as "obstacles". In the embodiment of FIG. 7 a plurality of obstacles are provided in the inlet 20, the obstacles being in the form of cylindrical rods or posts 82. However, it will be appreciated that the obstacles may take various forms, and that the rods 82 are only one possible form of obstacle.

The rods 82 are placed in the inlet 20, between the tapering side walls 38 and downstream of mouth 726, so as to break up the jet of brine entering the inlet 20 and distribute the flow of brine substantially evenly across the width of channel 62. FIG. 7 shows the rods 82 being arranged in a specific pattern to achieve this goal. In this regard, the rods 82 are arranged in a plurality of rows, each row being parallel to the width (W) of channel 62 and to the other row(s) of rods 82. The rods 82 in each row are substantially evenly spaced from one another and the outermost rods 82 are located close to the tapering side walls 38 so as to prevent significant bypass flow around the rods 82. The rods 82 in adjacent rows may be staggered, such that the flow of brine will follow a tortuous path as it passes through the array of rods 82. Although two rows of rods 82 are shown in FIG. 7, it will be appreciated that the obstacles may include more or fewer rows of rods 82, and that the rods 82 are not necessarily arranged in rows.

FIG. 7 illustrates a specific arrangement and spacing of rods 82. According to this arrangement, the spacing S1 between adjacent rods in a row is less than the spacing S2 between rods in adjacent rows, and may be from about 10-40% of W, the full width of channel 62. Also, the diameter or width of each obstacle or rod 82 may be about 5-30% of W. In the specific arrangement shown in FIG. 7, the spacing S1 is about 20% of W, spacing S2 is about 30% of W, and the diameter D of each rod 82 is about 8% of W.

Figure 8:
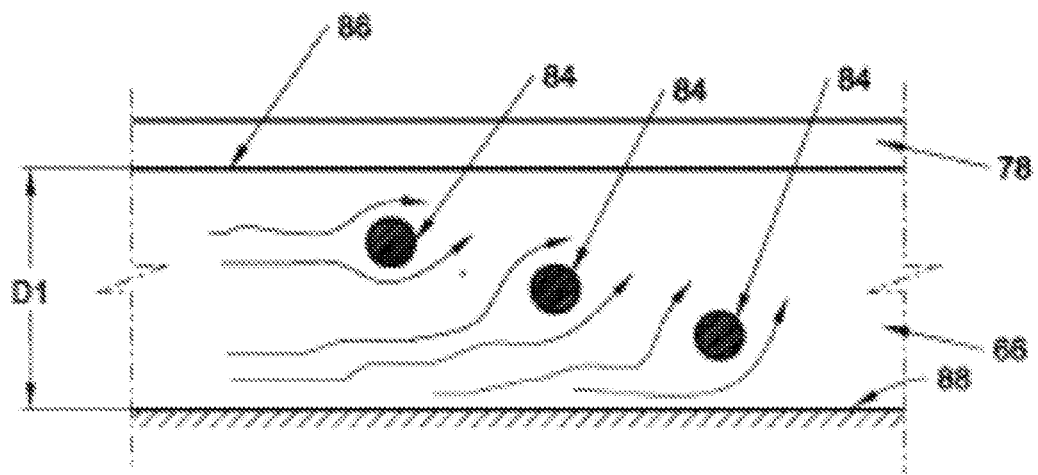
FIG. 8 is a partial longitudinal cross section along line 8-8' of FIG. 6.

In addition to improving flow distribution across the inlet of the first channel, it is possible to use obstacles to improve the flow distribution throughout the depths of the channels. This is now explained below with reference to FIGS. 6 and 8. FIG. 8 is a partial longitudinal cross-section through channel 66 of pond 60. Extending across the width of channel 66 are a plurality of submerged obstacles in the form of cylindrical rods 84. Although FIG. 8 shows submerged obstacles in the form of cylindrical rods 84, it will be appreciated that the obstacles may take various forms, and that the rods 84 are only one possible form of obstacle.

As shown in FIGS. 6 and 8, channel 66 includes a plurality of rods 84, each extending across substantially the entire width of the channel 66, and being submerged below the surface 86 of the brine in channel 66, and being spaced above the bottom wall 88 of channel 66. It will, however, be appreciated that one or more rods 84 may be located at the surface 86 of channel 66, or contacting the bottom wall 88. In the arrangement of FIG. 8, three rods 84 are provided, the rods 84 being parallel to one another and horizontal, and being arranged in staggered fashion along the length of channel 66 and throughout the depth (D1) of channel 66. In this regard, the spacing of rods 84 above the bottom wall 88 decreases along the direction of the brine flow. As the brine flows past the rods 84, as shown by the arrows in FIG. 8, currents with a vertical component are produced, resulting in distribution of flow throughout the depth of channel 66.

Although the rods 84 can be placed at any point in any of the channels of pond 60, it is most advantageous to place the rods across the width of a channel immediately downstream of a gap 80 between two channels. For example, as shown in FIG. 6, the rods 84 may be located immediately downstream of gap 80 separating channels 64 and 66. This location of rods 84 helps to reduce the size of dead zones downstream of the gap 80 and improve the flow and temperature distribution throughout the depth of channel 66.

Although FIGS. 6 and 8 show three rods 84 in a specific arrangement and a specific location, it will be appreciated that the obstacles are not necessarily cylindrical rods, that the obstacles are not necessarily arranged as shown in FIG. 8, and that the obstacles may be provided downstream of any of the gaps 80 in pond 60.

Although the invention has been described in connection with certain embodiments disclosed herein and shown in the drawings, it is not intended to be limited thereto. Rather, the invention is intended to include all embodiments which may fall within the scope of the following claims.

What is claimed is:

1. A pond for cooling an aqueous solution, comprising:
   (a) a plurality of channels arranged side-by-side, each of the channels being defined by a plurality of sides;
   (b) an inlet provided in a side of one of said channels for receiving said aqueous solution;
   (c) an outlet provided in a side of another one of said channels for discharging said aqueous solution from the pond;
   (d) at least one dike, wherein each said dike separates an adjacent pair of said channels from one another and defines one of the sides in each of the channels which it separates, said adjacent pair of channels comprising an upstream channel and a downstream channel; and
   (e) at least one gap, wherein each said gap is formed in one of said dikes to permit the aqueous solution to flow between the upstream channel and the downstream channel, the gap having a length which is about 10 to about 40 percent of the length of the sides of the channels;
   wherein at least some of the channels have a generally rectangular shape with a pair of longer sides and a pair of shorter sides, and wherein the dikes define at least one of the longer sides of each said channel;
   wherein the inlet is defined by an inlet opening and a pair of outwardly diverging walls which provide the inlet with a fan shape; and
   wherein each of the outwardly diverging walls of the inlet extends outwardly from the inlet opening to one of the longer sides of the channel in which the inlet is provided.

2. The pond according to claim 1, wherein each of the gaps has a length which is about 20 to about 40 percent of the length of the sides of the channels.

3. The pond according to claim 1, wherein each of the gaps is located proximate to an end of one of the dikes.

4. The pond according to claim 3, wherein the pond includes a plurality of said dikes and a plurality of said gaps, and wherein the gaps in an adjacent pair of said dikes are located at opposite ends of said dikes.

5. The pond according to claim 4, wherein the dikes are substantially parallel to one another.

6. The pond according to claim 1, wherein the side of the channel in which the inlet opening is provided is one of the shorter sides of the channel.

7. The pond according to claim 1, wherein the inlet is provided with a plurality of upstanding obstacles located between the outwardly diverging walls.

8. The pond according to claim 7, wherein the obstacles comprise a plurality of rods arranged in spaced relation to one another.

9. The pond according to claim 8, wherein the rods are arranged in a plurality of rows extending parallel to a width of the channel in which the inlet is provided, and wherein adjacent rows are staggered relative to one another.

10. The pond according to claim 1, wherein the channels are arranged in one or more rows.

11. The pond according to claim 1, wherein said plurality of channels includes a first channel located proximate to the inlet and a second channel located proximate to the outlet; and wherein the first channel has a different aspect ratio than the second channel.

12. The pond according to claim 11, wherein the first channel has a lower aspect ratio than the second channel, and is wider than the second channel.

13. The pond according to claim 12, wherein the first channel is deeper than the second channel.

14. The pond according to claim 1, wherein each of the gaps has a length which is about 25 to about 35 percent of the length of the sides of the channels.

15. The pond according to claim 1, wherein at least one of the channels is provided with one or more submerged obstacles, each of which extends across substantially an entire width of the downstream channel.

16. The pond according to claim 15, wherein the submerged obstacles are located immediately downstream of the gap between the upstream channel and the downstream channel.

17. The pond according to claim 15, wherein the submerged obstacles comprise a plurality of rods which are parallel to each other and arranged in staggered fashion along a length of the downstream channel.

18. The pond according to claim 17, wherein each of the rods is spaced between a surface of the downstream channel and a bottom wall of the downstream channel.

* * * * *